Feb. 16, 1932. P. P. HENSHALL 1,845,498
BY-PASS CASING
Filed March 27, 1929 2 Sheets-Sheet 2
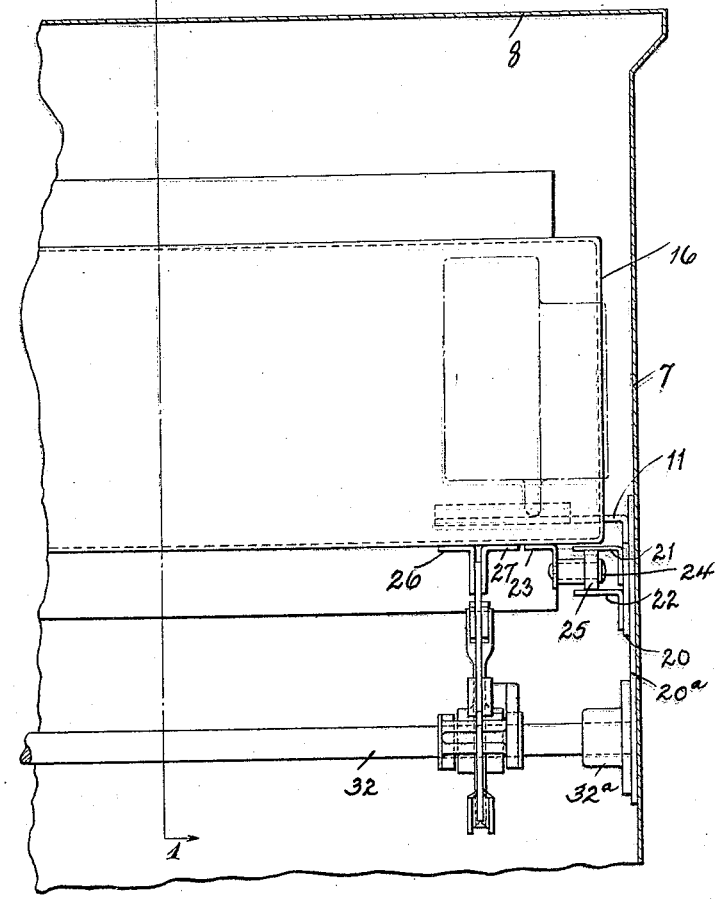
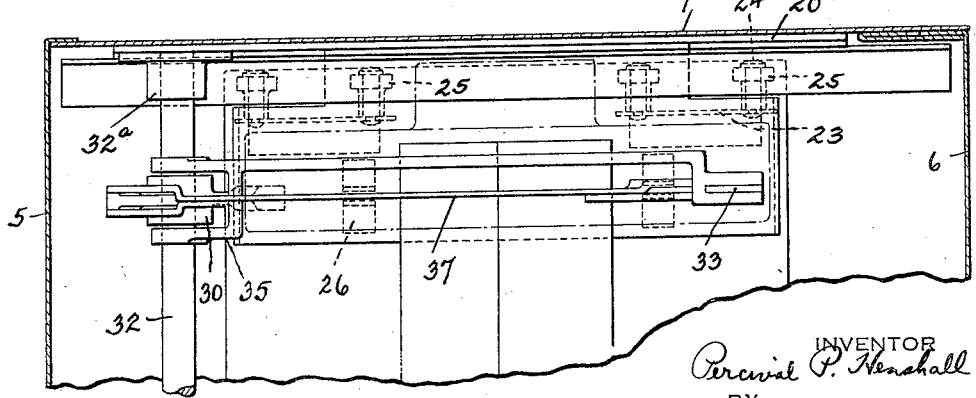

Patented Feb. 16, 1932

1,845,498

UNITED STATES PATENT OFFICE

PERCIVAL P. HENSHALL, OF PHILADELPHIA, PENNSYLVANIA

BY-PASS CASING

Application filed March 27, 1929. Serial No. 350,424.

This invention relates to improvements in heating and ventilating units and more particularly to what I term a by-pass casing for the heat element employed, said unit being of the type shown and described in my Patent No. 1,608,938, granted Nov. 30th, 1926.

Briefly, it may be pointed out that heating and ventilating units of the type referred to comprise an upright casing or housing having an air inlet, an electrically operated fan or blower for driving fresh air through the casing, a heating element or radiator, preferably of the fin type through which the air is driven, and located in proximity to the discharge outlet of the casing or housing, and a by-pass mechanism for controlling the passage of air within the casing to partially or entirely by-pass the heating element.

Heretofore, the by-pass mechanism employed has been a mechanically thermostatically or electrically controlled damper, often referred to as a mixing damper since it is desired to vary the volume of cold and hot air admitted into the room to maintain the desired temperature. Since the radiator in the casing is exposed regardless of the position of the by-pass damper, the generated heat passing through the outlet becomes a disturbing factor in the control of the room temperature.

The primary object of my invention is to provide a by-pass casing or enclosure for the heating element or radiator which may be opened to permit all the air to pass through the radiator, or closed to permit all the air to by-pass the radiator, or partly opened or partly closed to vary the volume of cold and hot air thereby controlling the temperature of the air discharged from the unit.

Another object of my invention is to provide a sectional by-pass casing or housing for the heating element or radiator of an apparatus of the above type whereby the temperature of the air being discharged through the outlet into the room is substantially the same temperature of the air drawn into the fans.

Another object of my invention is to provide a sectional casing or housing for the heating element or radiator of a heating and ventilating unit including provision for partially opening said casing to by-pass a definite volume of cold air and thoroughly mix it with a volume of generated hot air coming vertically through the radiator before it is discharged through the outlet of the machine into the room.

Another object of my invention is to provide a by-pass casing for a radiator which may be manually, electrically or thermostatically controlled to vary the temperature of mixture of cold and hot air within the apparatus before it is discharged and thus avoid objectionable drafts into the room.

My invention consists of a sectional casing or housing for heating element such as a fin type radiator in which the sections may be spread to vary the opening and regulate the volume of air passed through the radiator.

My invention further consists of a sectional casing or housing having mechanical means for opening and closing said casing to predetermined degrees including an air tight edge connection for preventing the admission of cold air to the radiator or the passage of hot air from the radiator when the casing is closed.

To enable others skilled in the art to fully comprehend the underlying features and advantages of my invention and other objects and results obtained by the construction and description that follows, reference is had to the accompanying drawings showing a preferred embodiment of the invention in which Fig. 1 is a sectional view taken on the line 1—1 of Fig. 2.

Fig. 2 is a fragmentary view partly in section showing the return end of the apparatus.

Fig. 3 is a view taken on the line 3—3 of Fig. 1.

Figure 1:
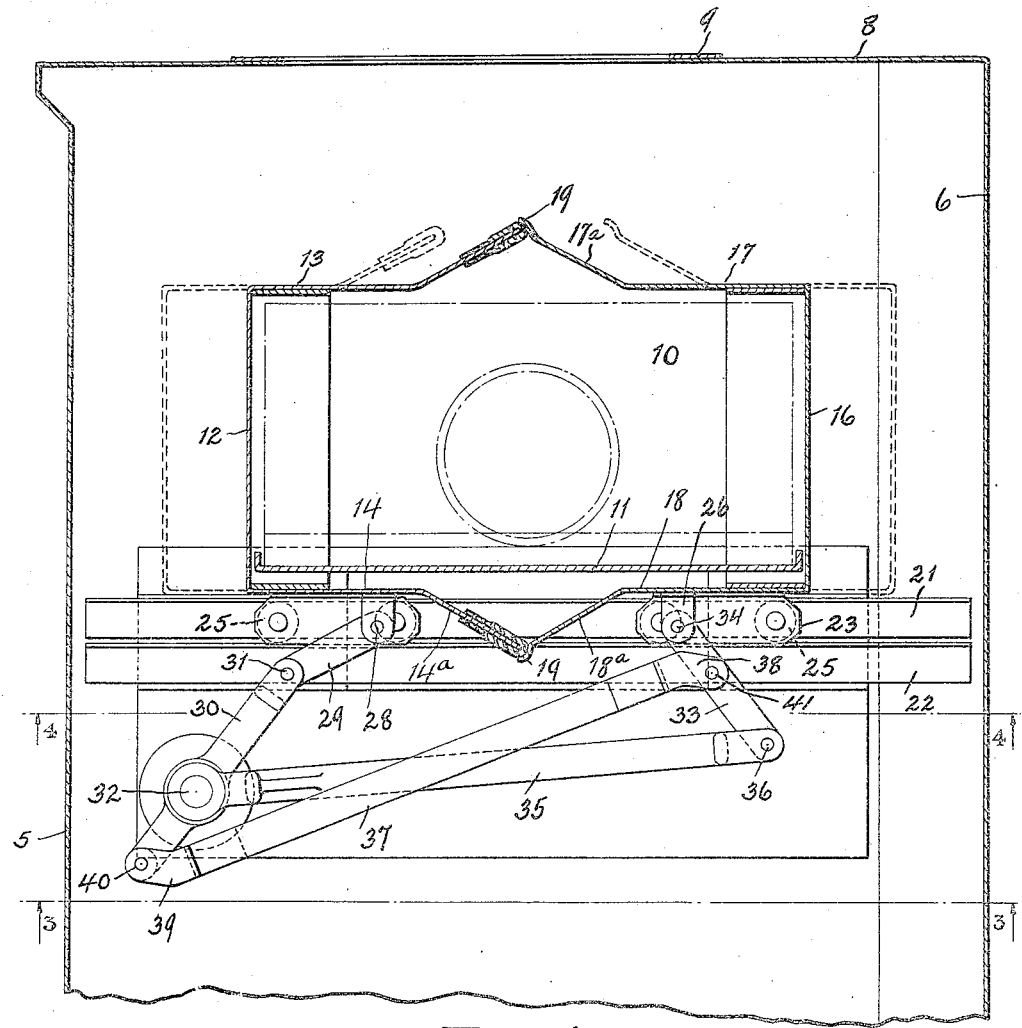
Figure 4:
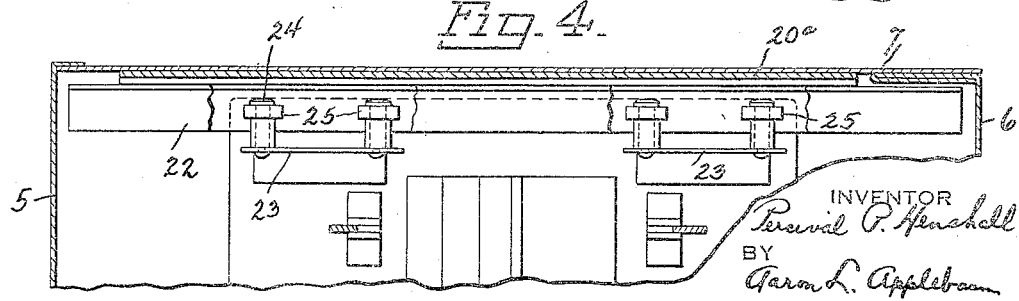
Fig. 4 is a view taken on the line 4—4 of Fig. 1.

Referring now to the drawings wherein like reference characters designate corresponding parts throughout the several views, 5 designates the front wall, 6 the rear wall, 7 an end wall and 8 the top of a heating and ventilating unit or apparatus usually provided with an outlet grille 9 in the top whereby the air may be introduced directly into the room. The radiator 10 shown in broken lines, Fig. 1, is preferably of the fin type, being mounted on the end radiator supports 11.

The by-pass casing or housing for the radiator consists of a front box-like section and a rear box-like section adapted to be opened to varying degrees to permit the cold air to pass through the radiator or completely closed so that the cold air may by-pass the radiator and be discharged into the room without changing the temperature of the air as drawn into the unit by the fans or blowers (not shown). The front section comprises a longitudinal front wall 12, end walls, top 13 and bottom 14. The top and bottom are provided with an upwardly and a downwardly bent extension 13a, 14a respectively and the outer edges thereof are covered by sealing strips 15 of felt, rubber or an equivalent material. The complementary rear box-like section is substantially similar in construction, consisting of a longitudnal rear wall 16, end walls, top 17 and bottom 18, said top and bottom having upwardly and downwardly bent extensions 17a, 18a respectively having slightly curved edges 19 adapted to engage the sealing strips of the front box-like section when the casing or housing is closed, thus preventing the passage of cold air through the radiator or the discharge of hot air from the radiator. Consequently, when the box-like sections are in their closed position, the cold air may completely by-pass the radiator and discharge through the outlet into the room at substantially the same temperature as when drawn into the fans or blowers. On the other hand when the box-like sections are in their partially opened positions as indicated by dotted lines in Fig. 1, part of the cold air may be mixed with the warm air in the chamber above the radiator before the tempered air is discharged through the outlet of the grille.

Various mechanical pneumatic and electrical means may be resorted to for separating or spreading the front and rear box-like sections. In the form of the invention shown, the ends 7 of the main casing of the unit are provided with base plates 20a and filler plates 20 and longitudinal top and bottom, angle or roller guides 21, 22. Roller brackets 23 fastened to the bottom and at each end of the roller shoulder pins 24 and rollers 25 freely operable on the angle or roller guides.

The operating or actuating mechanism for each box like casing comprises a pair of link brackets 26, 27 attached to the bottom of each of said casings. To the brackets of the front casing there is pivotally connected at 28 a link 29. To the opposite end of the link 29, an operating lever 30 is pivotally connected as at 31, said lever being provided with a collar keyed to a cross shaft 32 mounted in end bearings 32a. To the link brackets of the rear casing, a link 33 is pivotally connected as at 34, said operating link being somewhat longer than the link 29. A guide lever 35 mounted on the cross shaft is pivotally connected at 36 to the lower end of the link 33 and a connecting link 37 having bent ends 38, 39 pivotally connected at 40 to the lower end of the operating lever and at 41 to the link 33 as clearly shown by Fig. 1.

From the above construction it will be apparent that by rotating the shaft to any desired degree, the lever and link mechanism connected to the bottom of front and rear sections of the casing, will cause said sections to be shifted, the smooth operation of the mechanism and the opening and closing of the sectional casing for the radiator or heating element being produced by reason of the supporting rollers operable upon the roller guides.

While I have shown and described my invention with some degree of particularity, it will be realized that modifications and changes may be resorted to under special conditions. I therefore do not wish to be limited and restricted to the exact details shown and described but reserve the right to make such changes and modifications as may fairly fall within the scope of the subject matter now being claimed.

Having shown and described my invention, what I claim as new and desire to secure by Letters Patent is:—

1. In a heating and ventilating apparatus, a main casing, a heating element therein, and a by-pass casing independent of the main casing and entirely enclosing said element.

2. In a heating and ventilating apparatus, a main casing, a heating element, a by-pass casing independent of the main casing and entirely enclosing said element therein, said by-pass casing consisting of two sections which may be moved relatively and closed to exclude the air from said element or opened to permit the air to pass through the said element.

3. In a heating and ventilating apparatus, a main casing, a heating element therein, a by-pass casing for said element within the main casing, said by-pass casing consisting of two sections having means by which it may be closed at the top and bottom to exclude the air from said element or opened to permit the air to pass through the said element.

4. In a heating and ventilating apparatus, a heating element, a by-pass casing for said element, said casing consisting of complementary sections which may be closed at the top and bottom to exclude the air from said element or opened to varying degrees to permit the air to pass through the said element.

5. In a heating and ventilating apparatus, a main casing, a heating element therein, a by-pass casing comprising relatively movable sections adapted to enclose said element, and means for opening and closing said casing.

6. In a heating and ventilating apparatus, a heating element therein, a by-pass casing comprising two complementary sections adapted to enclose said element, and means for shifting said sections relatively to said radiator to control the passage of air therethrough.

7. In a heating and ventilating apparatus, a heating element, a by-pass casing comprising relatively movable front and rear sections enclosing said element, and means connected to said sections to vary the opening between them to control the passage of air therethrough.

8. In a heating and ventilating apparatus, a heating element, a by-pass casing comprising a front section and a rear section adapted to completely enclose said element, and means for shifting said sections connected to one wall of each of said sections to vary the opening between them and to control the passage of air therethrough.

9. In a heating and ventilating apparatus, a heating element, a by-pass casing consisting of two complementary sections adapted to enclose said element, each of said sections having a vertical end wall, sides, top and bottom, and means connected to the bottom of the respective sections for separating the same relatively to the heating element to control the passage of air therethrough.

10. In a heating and ventilating apparatus, a heating element, a by-pass casing comprising two relatively movable box-like sections adapted to completely enclose said unit in one position, and means for separating said sections to vary the opening between them and to control the passage of air therethrough.

11. In a heating and ventilating apparatus, a heating element, a by-pass casing comprising two relatively movable sections adapted to completely enclose said element in one position, said sections being disposed with their top and bottom meeting edges between the front and rear of said element, and means for separating said sections to vary the opening between them and control the passage of air therethrough.

12. In a heating and ventilating apparatus, a heating element, a by-pass casing comprising two relatively movable sections adapted to completely enclose said element in one position with the top and bottom meeting edges of said sections between the front and rear sides of the element, a sealing strip on one of the edges for preventing the passage of air when said sections are closed, and means for separating said sections to vary the opening between them and control the passage of air therethrough.

13. In a heating and ventilating apparatus, a heating element, a by-pass casing comprising two relatively movable sections adapted to completely enclose said element, each of said sections having an upwardly bent top and a downwardly bent bottom portion, a sealing strip on the inner edge of the bottom of one of said sections for preventing the passage of air therethrough when said sections are closed, and means for separating said sections to vary the opening between them and control the passage of air therethrough.

14. In a heating and ventilating apparatus, a heating element, a by-pass casing comprising two relatively movable sections for completely enclosing said element in one position, lever and link mechanism connected to said sections, and an operating shaft for actuating said lever and link mechanism to separate and bring together said sections and vary the opening between them to control the passage of air therethrough.

15. In a heating and ventilating apparatus, a heating element, a by-pass casing comprising two relatively movable sections for completely enclosing said element, rollers supported by said sections, guides on which said rollers operate, lever and link mechanism connected to said sections, and an operating shaft for actuating said mechanism to separate and bring together the sections to control the passage of air therethrough.

In testimony whereof I affix my signature.

PERCIVAL P. HENSHALL.